(12) United States Patent
Sano

(10) Patent No.: US 11,807,460 B2
(45) Date of Patent: Nov. 7, 2023

(54) CHUTE TUBE FOR TRANSFERRING PARTICLES

(71) Applicant: Toyo Engineering Corporation, Tokyo (JP)

(72) Inventor: Keishi Sano, Narashino (JP)

(73) Assignee: TOYO ENGINEERING CORPORATION, Tokyo (JP)

( * ) Notice: Subject to any disclaimer, the term of this patent is extended or adjusted under 35 U.S.C. 154(b) by 0 days.

(21) Appl. No.: 17/600,375

(22) PCT Filed: May 19, 2020

(86) PCT No.: PCT/JP2020/019761
§ 371 (c)(1),
(2) Date: Sep. 30, 2021

(87) PCT Pub. No.: WO2020/250628
PCT Pub. Date: Dec. 17, 2020

(65) Prior Publication Data
US 2022/0153524 A1  May 19, 2022

(30) Foreign Application Priority Data
Jun. 12, 2019  (JP) .................................. 2019-109185

(51) Int. Cl.
*B65G 11/20*  (2006.01)
*B65G 11/08*  (2006.01)

(52) U.S. Cl.
CPC .............. *B65G 11/20* (2013.01); *B65G 11/08* (2013.01)

(58) Field of Classification Search
CPC ....... B65G 11/20; B65G 11/08; B65G 11/088; B65G 11/083; B65G 11/026
See application file for complete search history.

(56) References Cited

U.S. PATENT DOCUMENTS

| 1,947,011 A | * | 2/1934 | Karthauser | .......... B65G 11/026 |
| | | | | 193/2 R |
| 4,697,686 A | * | 10/1987 | West | ...................... B65G 53/56 |
| | | | | 193/29 |
| 9,334,119 B2 | | 5/2016 | Takasugi et al. | |

FOREIGN PATENT DOCUMENTS

| EP | 1796826 B1 | 6/2007 |
| JP | 5275277 | 6/1977 |
| JP | 5533891 | 3/1980 |
| JP | 6036207 A | 2/1985 |

(Continued)

OTHER PUBLICATIONS

International Search Report with English Translation issued in corresponding International Application No. PCT/JP2020/019761 dated Aug. 18, 2020 (5 pages).

(Continued)

*Primary Examiner* — William R Harp
(74) *Attorney, Agent, or Firm* — FLYNN THIEL, P.C.

(57) ABSTRACT

A chute tube for facilitating particle transfer and distribution. The chute tube for transferring particles has a charging chute tube with a charge inlet of particles, a discharging chute tube and an intermediate chute tube slantingly connected between the charging chute tube and the discharging chute tube. The intermediate chute tube includes a groove without steps formed by a combination of a first inclined surface and a second inclined surface, and the groove is of a cross-sectional shape corresponding to two adjacent sides of a triangle.

8 Claims, 4 Drawing Sheets

(56) References Cited

FOREIGN PATENT DOCUMENTS

JP          68204 U    2/1994
JP     5840870 B2   12/2012

OTHER PUBLICATIONS

Written Opinion of International Searching Authority issued in corresponding International Application No. PCT/JP2020/019761 dated Aug. 18, 2020 (4 pages).
English Translation of the International Preliminary Report on Patentability and Written Opinion, issued in corresponding International Application No. PCTIJP2020/019761, dated Aug. 18, 2020 (6 pages).
India Office Action with English translation issued in corresponding India Application No. 202117043867, dated Jul. 4, 2023 (6 pages).

\* cited by examiner (a)

(b)

(c)

(a)

(b)

CHUTE TUBE FOR TRANSFERRING PARTICLES

FIELD OF THE INVENTION

The present invention relates to, in some aspects thereof, a chute tube for transferring particles, a particle transfer apparatus including the chute tube for transferring particles, and a method for processing particles using the particle transfer apparatus.

BACKGROUND OF THE INVENTION

As means for transferring particles, chute tubes are widely used. FIG. 4 of JP-B 5840870 shows a chute, a transfer conveyor, and a transfer portion provided with a bucket conveyor for transferring hydrogenated petroleum resin pellets. The chute is described such that it is inclined at an angle in the range of 44 degrees to 75 degrees relative to a horizontal surface and a plurality of buffer plates are attached thereto.

JP-A S60-36207 discloses an invention of a gutter-shaped transfer apparatus provided with a transfer chute disposed to be inclined downwardly from one end toward the other, wherein a plurality of steps are formed on a transfer surface of the transfer chute at predetermined intervals in a transfer direction. The cross section of the transfer surface of the transfer chute of this transfer apparatus is V-shape and the transfer surface is capable of reducing the friction at the time of transferring by combination with the plurality of steps, and it is specially used for transferring popsicles.

SUMMARY OF THE INVENTION

The object of the present invention is to provide, in some illustrative aspects thereof, a chute tube for transferring particles which can be used for particle transfer and distribution tasks, a particle transfer apparatus including the chute tube for transferring particles, and a method for processing particles using the particle transfer apparatus.

The present invention provides, in one embodiment thereof, a chute tube for transferring particles including at least the following intermediate chute tube from among:

a charging chute tube having a charge inlet of particles;

a discharging chute tube located at a position vertically lower and horizontally different than the charging chute tube and connected to a subsequent unit having one or two or more functions selected from a function of distributing particles, a function of classifying particles and a function of conveying particles; and an intermediate chute tube which can be connected between the charging chute tube and the discharging chute tube in a slanting direction;

wherein the intermediate chute tube includes a groove without steps formed by a combination of a first inclined surface and a second inclined surface, and the groove is of a cross-sectional shape corresponding to two adjacent sides of a triangle.

The present invention provides, in another embodiment, a particle transfer apparatus including the chute tube for transferring particles, the apparatus being capable of transferring particles and performing processes according to the function of the subsequent unit.

The present invention provides, in still another embodiment, a method for processing particles using the particle transfer apparatus. In this processing method, the subsequent unit may be a divider for distributing particles, a screen for classifying particles, a conveyor for conveying particles or a combination thereof. The processing method may include a first stage of charging particles to the chute tube for transferring particles and a second stage of delivering the particles through the intermediate chute tube to the divider, the screen or the conveyor, and distributing the particles to each of a plurality of transfer pipes at a desired proportion amount, classifying the particles or conveying the particles, wherein when the particles pass through the intermediate chute tube in the second stage, all the particles move along the groove formed by the combination of the first inclined surface and the second inclined surface and are introduced to the divider, the screen or the conveyor, and thereafter distributed, classified or conveyed. During use, the chute tube may be arranged such that the groove is located at a vertically lower position.

Additional embodiments of the present invention will be described below and also explained based on the accompanying drawings.

The chute tube for transferring particles of the present invention can transfer particles as it concentrates them into a narrow flow by the function of the intermediate chute tube, so that, for example, the particles can be easily distributed at desired proportions in a divider, and in addition, the particles can be evenly introduced to a subsequent unit such as a screen or a conveyor, thereby enabling the subsequent unit to appropriately exhibit its performance. In addition, the particle transfer apparatus including the chute tube for transferring particles of the present invention is capable of appropriately performing the particle transfer and processes according to the function of the subsequent unit. Furthermore, with the method for processing particles using such a particle transfer apparatus, a process such as particle distribution, classification or conveyance can be appropriately and readily performed without any inconvenience such as damage to particles.

EMBODIMENTS OF THE INVENTION

Figure 1:
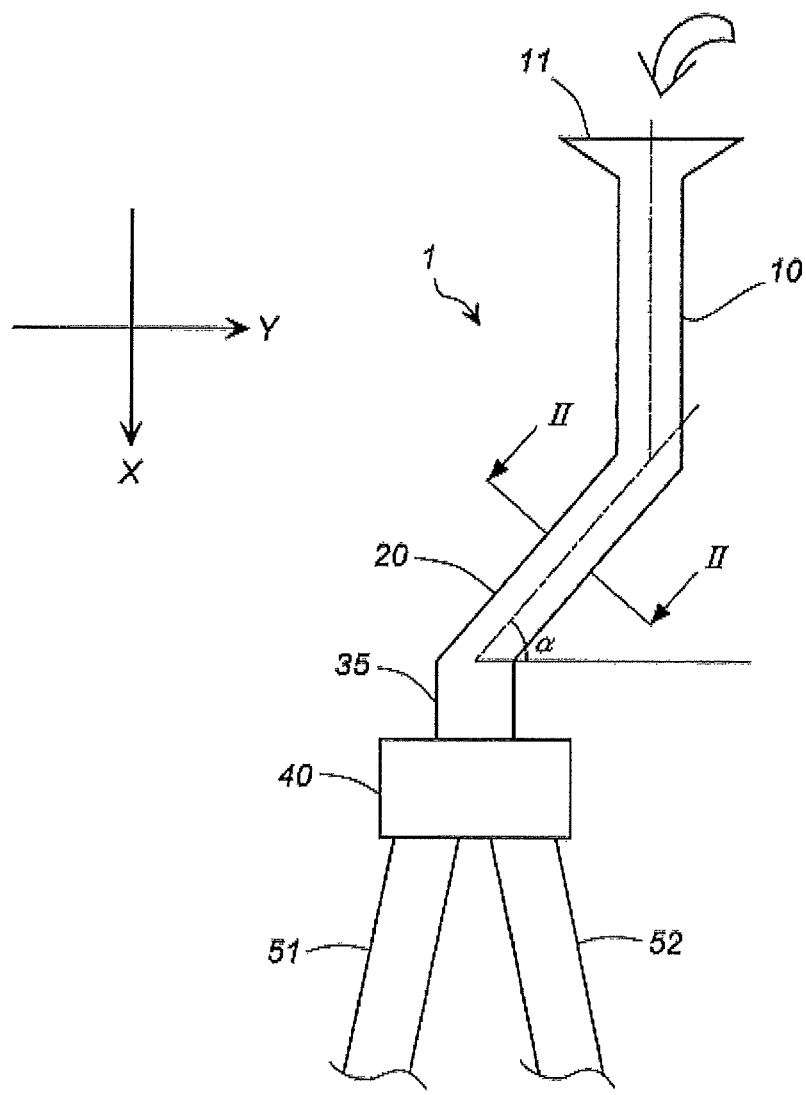
FIG. 1 is a front view of a particle transfer and distribution apparatus according to one illustrative embodiment including a chute tube for transferring particles of the present invention.

<Chute Tube for Transferring Particles and Particle Transfer Apparatus Using the Same>

Referring to the drawings, a chute tube for transferring particles (hereinafter, simply referred to as "chute tube") of the present invention is described. In an illustrative embodiment shown in FIG. 1, a chute tube 1 includes a charging chute tube 10, an intermediate chute tube 20 and a discharging chute tube 35.

In the present invention, the intermediate chute tube 20 is essential, and the charging chute tube 10 and the discharging chute tube 35 may be optionally used by combination with the intermediate chute tube 20 depending on a difference in height between units connected by the chute tube 1. While a material of the chute tube 1 is not particularly limited and a metal such as stainless steel, synthetic resin or the like may be used, stainless steel is preferable in some examples. The size of the chute tube 1 or the thickness of the tube wall is not particularly limited and can be appropriately adjusted according to the flow rate of particles transferred or the strength required.

The type of particles to be transferred and distributed in the chute tube 1 is not particularly limited and may be an organic matter or an inorganic matter. The particles of interest may be spherical particles or approximately spherical particles of a particle size which may be in the range of 0.5 mm to 10 mm in one example, and in the range of 0.5 to 5 mm in another example. In one non-limiting embodiment, the particles may be hygroscopic particles. For example, the chute tube 1 can be applied to the transportation of urea particles. In one example, the urea particles may be urea particles of a particle size substantially in the range of 0.5 to 5 mm.

The upper side of the charging chute tube 10 includes a charge inlet 11 from which particles to be transferred and distributed are charged. As for the charge inlet 11, an end opening portion of the charging chute tube 10 may be used as a charge inlet, and in addition, the end opening portion may be expanded as necessary or a funnel-shaped separate member may be attached thereto to facilitate the charge of particles. When the separate member is applied as a charge inlet 11, the charge inlet 11 may be fixed to the charging chute tube 10 or may be detachable.

A width-directional cross-sectional shape of the charging chute tube 10 is not particularly limited as long as the charging chute tube 10 can be connected to the intermediate chute tube 20. According to some examples, this cross-sectional shape is preferably a quadrangle from a manufacturing point of view. While the charging chute tube 10 is disposed such that a central axis in the longitudinal direction of the tube is oriented in a vertical direction (the X-direction in FIG. 1), it may be disposed such that the central axis is oriented in a slanting direction (a slanting direction relative to the X-direction in FIG. 1).

The length of the charging chute tube 10 may be adjusted according to a difference in height between units connected via the chute tube 1 and in some examples, it is preferable that it should be substantially shorter than the length of the intermediate chute tube 20. Note that, in the drawings, each member does not necessarily reflect its actual size.

Note that the charge inlet 11 is connected to the intermediate chute tube 20 when the charging chute tube 10 is not provided. The way and configuration of the connection may be the same as those in the case where the charge inlet 11 is connected to the charging chute tube 10.

In the embodiment shown in FIG. 1, the discharging chute tube 35 is located at a position vertically lower and horizontally (in the Y-direction in FIG. 1 and the direction perpendicular to the X-direction) different than the charging chute tube 10. While in the illustrated example, the discharging chute tube 35 is disposed such that a central axis in the longitudinal direction of the tube is oriented in a vertical direction (the X-direction in FIG. 1), it may be disposed such that the central axis is oriented in a slanting direction (a slanting direction relative to the X-direction in FIG. 1).

A width-directional cross-sectional shape of the discharging chute tube 35 may be any shape as long as the discharging chute tube 35 can be connected to the intermediate chute tube 20 and a divider 40. According to some examples, this cross-sectional shape is preferably a quadrangle from a manufacturing point of view. The length of the discharging chute tube 35 may be adjusted according to a difference in height between units connected via the chute tube 1 and in some examples, it is preferable that it should be substantially shorter than the length of the intermediate chute tube 20.

In the particle transfer and distribution apparatus shown in FIG. 1, the discharging chute tube 35 can be connected to the divider 40 having a function of distributing particles. When the discharging chute tube 35 is not provided, the divider 40 can be connected to the intermediate chute tube 20.

While in the embodiment shown in FIG. 1, the intermediate chute tube 20 is connected to the divider 40 via the discharging chute tube 35, and in another embodiment, the intermediate chute tube 20 can be connected directly or via the discharging chute tube 35 to a screen having a function of classifying particles. In another embodiment, the intermediate chute tube 20 can also be connected directly or via the discharging chute tube 35 to a different subsequent unit such as a conveyor having a function of conveying particles. In addition, in still another embodiment, a combination of a plurality of units such as the divider 40, a screen and a conveyor may also be used as a subsequent unit.

In the embodiment shown in FIG. 1, the intermediate chute tube 20 is connected between the charging chute tube 10 and the discharging chute tube 35 in a slanting direction. As mentioned above, when the charging chute tube 10 is not provided, the intermediate chute tube 20 is connected between the charge inlet 11 and the discharging chute tube 35 in a slanting direction; when the discharging chute tube 35 is not provided, the intermediate chute tube 20 is connected between the charging chute tube 10 and the divider 40 in a slanting direction; and when both the charging chute tube 10 and the discharging chute tube 35 are not provided, the intermediate chute tube 20 is connected between the charge inlet 11 and the divider 40 in a slanting direction.

In an illustrative embodiment, an angle ($\alpha$) formed between the intermediate chute tube 20 and a horizontal direction (the Y-direction of FIG. 1) may be in the range of 30 degrees or more and less than 90 degrees and is preferably in the range of 40 degrees to 60 degrees.

Figure 2:
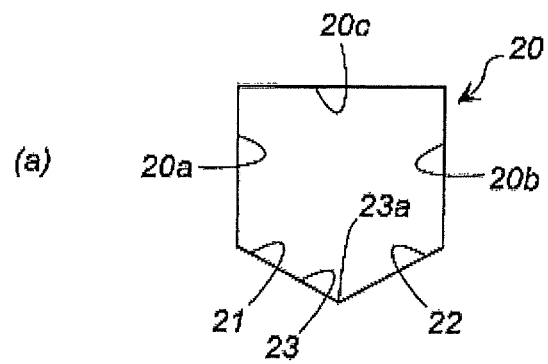
FIG. 2 illustrates cross-sectional views along the II-II line of FIG. 1 viewed in the direction indicated by the arrows, and each of FIG. 2(a) to FIG. 2(c) shows an illustrative embodiment with a different cross-sectional shape.
Figure 2:
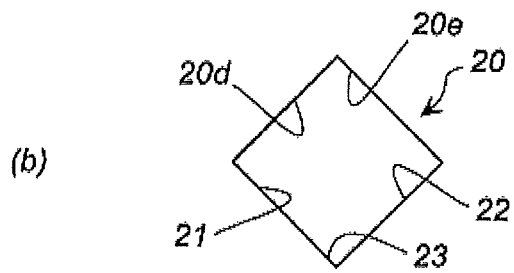
Figure 2:
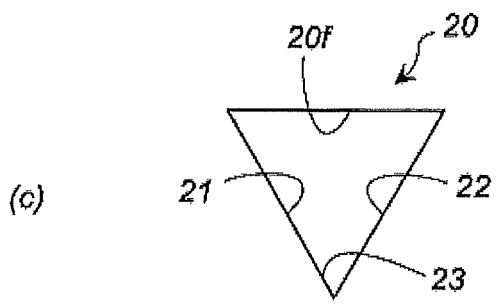

Referring to FIG. 2(a) to FIG. 2(C), cross-sectional views along the II-II line of FIG. 1 viewed in the direction indicated by the arrows, the intermediate chute tube 20 includes a groove 23 without steps formed by a combination of a first inclined surface 21 and a second inclined surface 22. The groove 23 is located at a vertically lower position in the intermediate chute tube 20. In other words, the groove 23 extends along the bottom of the intermediate chute tube 20 which extends in a slanting direction.

In an illustrative embodiment of the present invention, both the first inclined surface 21 and the second inclined surface 22 are flat surfaces and the groove 23 includes no steps, specifically, steps in the longitudinal direction of the intermediate chute tube 20 or a particle transfer direction. If the groove 23 includes steps, particles may come in contact with corner portions formed by the steps in the inner surface of the chute tube, thereby causing a problem that particles, i.e., products are damaged and accompanying dust may readily be produced therefrom. The problem becomes more prominent when the hardness of particles transferred is lower.

The groove 23 is configured such that the cross-sectional shape thereof is a shape corresponding to two adjacent sides of a triangle, thereby concentrating transferred particles to the groove 23. In some illustrative embodiments, the intermediate chute tube 20 including the groove 23 is preferably of any form of the following first form to third form.
(First Form)

A form, when viewed in a cross-sectional shape as illustratively shown in FIG. 2(a), in which one side of a quadrangle such as a rectangle or a square is shaped as it corresponds to two adjacent sides of a triangle (two sides corresponding to the first inclined surface 21 and the second inclined surface 22) (a home-plate shape). The first form shown in FIG. 2(a) includes a first side-wall surface 20a extended from the first inclined surface 21, a second side-wall surface 20b extended from the second inclined surface 22, the second side-wall surface 20b being opposed to the first side-wall surface 20a in the width direction, and a top surface 20c located between the first side-wall surface 20a and the second side-wall surface 20b.
(Second Form)

A form, when viewed in a cross-sectional shape as illustratively shown in FIG. 2(b), in which a square is disposed such that any one of the corners (a portion corresponding to the groove 23) is located at a vertically (in the X-direction of FIG. 1) lower position. The second form shown in FIG. 2(b) includes, in addition to the first inclined surface 21 and the second inclined surface 22, a first inclined top surface 20d on the first inclined surface 21 side and a second inclined top surface 20e on the second inclined surface 22 side. The first inclined top surface 20d and the second inclined top surface 20e are interconnected. Note that, while FIG. 2(b) shows a square, it is not limited to a square and may be a rectangle or other quadrangles.
(Third Form)

A form, when viewed in a cross-sectional shape as illustratively shown in FIG. 2(c), in which a regular triangle is disposed such that any one of the corners (a portion corresponding to the groove 23) is located at a vertically (in the X-direction of FIG. 1) lower position. The third form shown in FIG. 2(c) includes, in addition to, the first inclined surface 21 and the second inclined surface 22, a top surface 20f stretched therebetween. While FIG. 2(c) shows a regular triangle, it is not limited to a regular triangle and may be an isosceles triangle or other triangles.

In some illustrative embodiments, an angle of the groove 23 in a cross-sectional shape (an angle formed between the first inclined surface 21 and the second inclined surface 22) may be equal to or greater than the angle of repose of particles to be transferred in order to prevent the particles from being stagnant, and is preferably 45 degrees to 130 degrees.

According to some illustrative embodiments, a plurality of flow rectifying plates may be arranged in one of or both the first inclined surface 21 and the second inclined surface 22 of the intermediate chute tube 20 for narrowing the width of the groove 23 so that the particles flow in a narrower width within the groove 23. In an example shown in FIGS. 3(a) and (b), on the first inclined surface 21 and the second inclined surface 22 of the intermediate chute tube 20, respectively, first flow rectifying plates 25 and second flow rectifying plates 30 are arranged in pairs at widthwise opposing positions (in bilateral symmetry in the longitudinal direction) of the intermediate chute tube 20. For example, two to ten pairs of the first flow rectifying plate 25 and the second flow rectifying plate 30 may be arranged.

Figure 4:
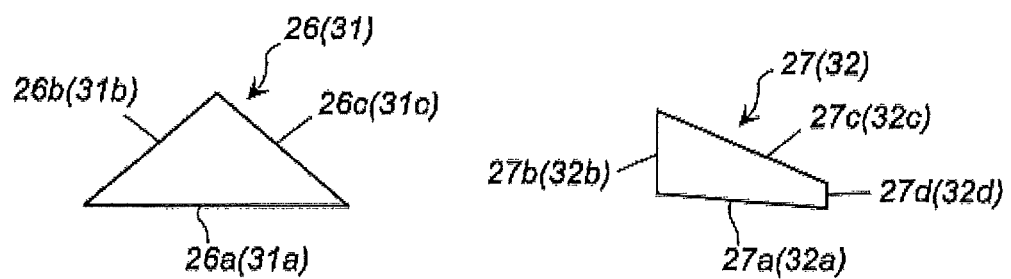
FIG. 4 is an exploded plan view of the flow rectifying plate used in FIG. 3.

The first flow rectifying plate 25 may be formed of, in one example, a combination of a first plate member 26 of a triangular planer shape and a second plate member 27 of a quadrangular planer shape as shown in FIG. 4, or the entire thereof may be formed of one plate member.

The first plate member 26 is preferably of an isosceles-triangular planer shape and such an isosceles triangle includes, for example, a long side 26a, a first short side 26b and a second short side 26c as shown in FIG. 4. The second plate member 27 may be, for example, a quadrangle whose four sides are different in length from one another. In one example, as shown in FIG. 4, the four sides are a first long side 27c, a second long side 27a, a first short side 27b and a second short side 27d in decreasing order of their length, and the first short side 27b and the second short side 27d are located at positions where they are mutually opposed and the first long side 27c is located at a position where it faces both the second long side 27a and the first short side 27b. An angle formed between the second long side 27a and the first short side 27b is more than 90 degrees and an angle formed between the second long side 27a and the second short side 27d is less than 90 degrees.

As illustratively shown in FIG. 3(b), when the first plate member 26 is of an isosceles-triangular planer shape, the long side 26a abuts the first inclined surface 21, and the first short side 26b is arranged between the first inclined surface 21 and the top surface 20c (see FIG. 2(a)) of the intermediate chute tube 20 while being spaced apart from the both. The first plate member 26 is arranged such that an angle $\beta_1$ formed between the first plate member 26 and a direction orthogonal to the length direction of the intermediate chute tube 20 (the width direction of the intermediate chute tube 20) is equal to or greater than the angle of repose of particles to be transferred, thereby preventing the particles to be transferred from being stagnant.

In the illustrated example, the length of the second long side 27a of the second plate member 27 is the same as that of the second short side 26c of the first plate member 26 and the second long side 27a is arranged to make contact with the second short side 26c. The first short side 27b of the second plate member 27 is arranged to make contact with the first inclined surface 21, and the second short side 27d is arranged between the first inclined surface 21 and the top surface 20c of the intermediate chute tube 20 while being spaced apart from the both.

The second plate member 27 is arranged such that the entire thereof is along the same direction as the length direction of the intermediate chute tube 20. Surfaces at which connecting surfaces of the first plate member 26 and the second plate member 27 make contact with each other (the surface of the second short side 26c of the first plate member 26 and the surface of the second long side 27a of the second plate member 27) and surfaces at which the first plate member 26 and the second plate member 27 make contact with the first inclined surface 21 (the surface of the long side 26a of the first plate member 26 and the surface of the first short side 27b of the second plate member 27) are each preferably processed such that the contact surfaces are formed as inclined surfaces that enable to make tight contact with each other.

In the illustrated example, the second flow rectifying plate 30 is arranged at a position where it is opposed to the first flow rectifying plate 25 in the width direction (in bilateral symmetry in the longitudinal direction) of the intermediate chute tube 20 and the shape of the second flow rectifying plate 30 is the same as that of the first flow rectifying plate 25 except that they are opposite in orientation. While the second flow rectifying plate 30 may be formed of a combination of a third plate member 31 of a triangular planer shape and a fourth plate member 32 of a quadrangular planer shape as shown in FIG. 4, the entire thereof may also be formed of one plate member.

The third plate member 31 is preferably of an isosceles-triangular planer shape and such an isosceles triangle includes, for example, a long side 31a, a first short side 31b and a second short side 31c as shown in FIG. 4. The fourth plate member 32 may be a quadrangle whose four sides are different in length from one another. In one example, as shown in FIG. 4, the four sides are a first long side 32c, a second long side 32a, first short side 32b and a second short side 32d in decreasing order of their length, and the first short side 32b and the second short side 32d are located at positions where they are mutually opposed and the first long side 32c is located at a position where it faces both the second long side 32a and the first short side 32b. An angle formed between the second long side 32a and the first short side 32b is more than 90 degrees and an angle formed between the second long side 32a and the second short side 32d is less than 90 degrees.

As illustratively shown in FIG. 3(b), when the third plate member 31 is of an isosceles-triangular planer shape, the long side 31a abuts the second inclined surface 22, and the first short side 31b is arranged between the second inclined surface 22 and the top surface 20c of the intermediate chute tube 20 while being spaced apart from the both. The third plate member 31 is arranged such that an angle $\beta_2$ formed between the third plate member 31 and a direction orthogonal to the length direction of the intermediate chute tube 20 (the width direction of the intermediate chute tube 20) is equal to or greater than the angle of repose of particles to be transferred, thereby preventing the particles to be transferred from being stagnant.

In the illustrated example, the length of the second long side 32a of the fourth plate member 32 is the same as that of the second short side 31c of the third plate member 31 and the second long side 32a is arranged to connect with the second short side 31c. The first short side 32b of the fourth plate member 32 is arranged to make contact with the second inclined surface 22, and the second short side 32d is arranged between the second inclined surface 22 and the top surface 20c of the intermediate chute tube 20 while being spaced apart from the both.

The fourth plate member 32 is arranged such that the entire thereof is along the same direction as the length direction of the intermediate chute tube 20. Surfaces at which connecting surfaces of the third plate member 31 and the fourth plate member 32 make contact with each other (the surface of the second short side 31c of the third plate member 31 and the surface of the second long side 32a of the fourth plate member 32) and surfaces at which the third plate member 31 and the fourth plate member 32 make contact with the second inclined surface 22 (the surface of the long side 31a of the third plate member 31 and the surface of the first short side 32b of the fourth plate member 32) are each preferably processed such that the contact surfaces are formed to be inclined surfaces that enable to make tight contact with each other.

While the first flow rectifying plate 25 and the second flow rectifying plate 30 used in the illustrated example may be made of a metal or synthetic resin, in some examples, the material of them is preferably the same as that of the intermediate chute tube 20.

In some illustrative embodiments, the first flow rectifying plate 25 and the second flow rectifying plate 30 may be attached by fitting them into attachment slots which are previously formed in the first inclined surface 21 and the second inclined surface 22. In that case, the intermediate chute tube 20 may be configured to be dividable into two halves, or when it is in the form of FIG. 2(a), the top surface 20c may be configured to be detachable.

In addition, when the intermediate chute tube 20, the first flow rectifying plate 25 and the second flow rectifying plate 30 are, for example, made of stainless steel, either of the following methods may be applied: a method of fixing the first flow rectifying plate 25 and the second flow rectifying plate 30 to the intermediate chute tube 20 by welding; or a method of fitting the first flow rectifying plate 25 (the first plate member 26 and the second plate member 27) and the second flow rectifying plate 30 (the first plate member 31 and the second plate member 32) into the attachment slots as mentioned above and thereafter fixing them by welding.

Note that, in some illustrative embodiments, unless affecting the particle transfer, the first plate member 26 and the second plate member 27 of the first flow rectifying plate 25 do not need to be connected by welding or the like as long as they make contact with each other. Similarly, in that case, the first plate member 31 and the second plate member 32 of the second flow rectifying plate 30 do not need to be connected by welding or the like either.

Figure 3:
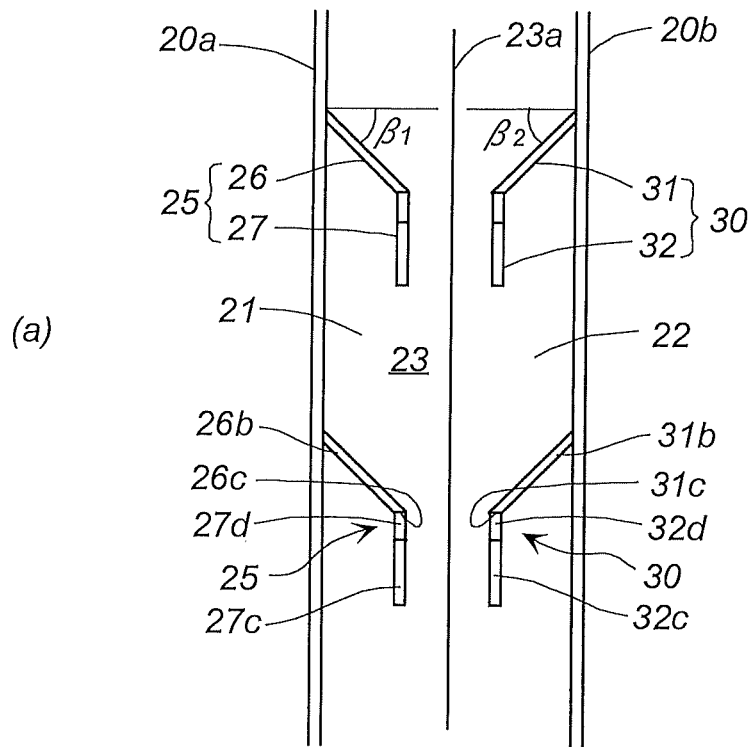
FIG. 3(a) is a plan cross-sectional view in which flow rectifying plates are arranged on an intermediate chute tube with the cross-sectional shape of FIG. 2(a)
FIG. 3(b) is a width-directional cross-sectional view of FIG. 3(a).
Figure 3:
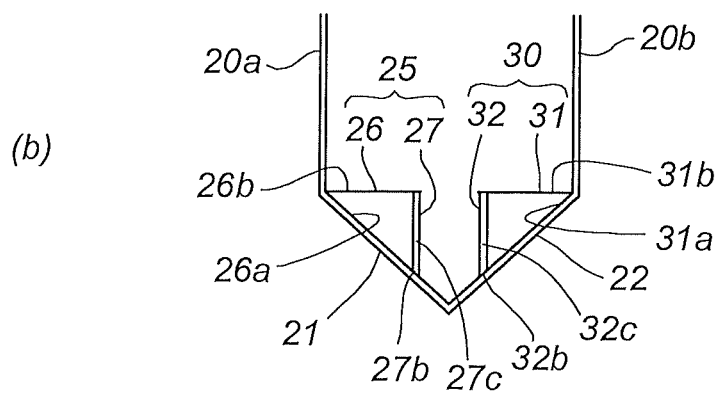

In the illustrative embodiment shown in FIG. 3, as the shape of the groove 23 formed by the first inclined surface 21 and the second inclined surface 22 is a tapered shape at the portion provided with the first flow rectifying plate 25 and the second flow rectifying plate 30, which are arranged to be opposed to each other in the width direction of the intermediate chute tube 20, the flow of the particles to be transferred can be rectified to a narrower range and delivered to the divider 40 (or a subsequent unit such as a screen or conveyor).

Figure 5:
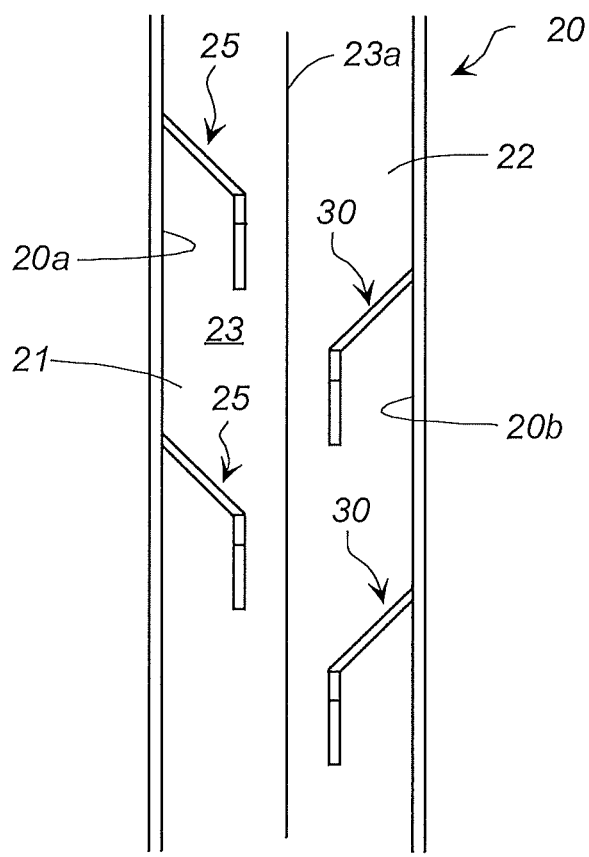
FIG. 5 is a plan cross-sectional view of an intermediate chute tube in which the flow rectifying plates are arranged differently from FIG. 3.

FIG. 5 shows a plan cross-sectional view of an intermediate chute tube in which the flow rectifying plates are arranged differently from FIG. 3. In this example, in the first inclined surface 21 and the second inclined surface 22 of the intermediate chute tube 20, respectively, the first flow rectifying plates 25 and the second flow rectifying plates 30 are alternately arranged in the length direction. Except for that, the example of FIG. 5 may be the same as FIG. 3.

Again referring to FIG. 1, in some illustrative embodiments, the divider 40 for distributing particles is connected to a discharge outlet of the discharging chute tube 35, and the first transfer pipe 51 and the second transfer pipe 52 for transferring particles distributed at the divider 40 are connected to the divider 40. When a screen or a conveyor is used as a subsequent unit, the screen or the conveyor may be connected thereto instead of the divider 40.

<Method for Processing Particles>

An illustrative method for processing particles using the particle transfer apparatus shown in FIG. 1 is described. With the processing method of the illustrative embodiment of the present invention, along with particle transfer, processes according to the function of a subsequent unit can be performed. This processing method may include a first stage and a second stage. The subsequent unit may be, for example, a divider for distributing particles, a screen for classifying particles, a conveyor for conveying particles or a combination thereof.

The first stage is a stage of charging particles to be processed to the chute tube 1 for transferring particles. The charge of particles may be performed by charging a predetermined amount of particles, which are, for example, conveyed with a liftable bucket, to the charge inlet 11 connected to the charging chute tube 10.

The second stage is a stage of delivering the particles charged from the charge inlet 11 through the charging chute tube 10, the intermediate chute tube 20 and the discharging chute tube 35 to the divider 40 and further distributing the particles to each of the first transfer pipe 51 and the second transfer pipe 52 at a desired proportion. When the particles pass through the intermediate chute tube 20 in the second stage, all the particles move along the groove 23 formed by the combination of the first inclined surface 21 and the second inclined surface 22 and are introduced to the divider 40, and thereafter distributed.

As all the particles pass through the groove 23 of the intermediate chute tube 20, they enter the divider 40 in a state concentrated into a narrow flow. Thus, the particles can be introduced around the center of the divider 40, so that the particles are easily distributed at a desired proportion to each of the first transfer pipe 51 and the second transfer pipe 52 when they are distributed at the divider 40. When the first flow rectifying plate 25 and the second flow rectifying plate 30 are provided, this function can be further enhanced.

A distribution proportion for each of the first transfer pipe 51 and the second transfer pipe 52 can be in the range of 0% to 100% of the total amount of the particles. Further, in the method of particle transfer and distribution or other processing of the present invention, even if particles of a small specific gravity or particles of a small particle size, which may not be considered to be readily concentrated into a narrow flow, are used, the function of the groove 23 of the intermediate chute tube 20 allows the particles to be introduced to the divider 40 in a state concentrated into a narrow flow, thereby facilitating the distribution.

For example, when a screen having a function of classifying particles is used instead of the divider 40, the particles can be fed to the center of the screen in a concentrated state. The introduced particles are evenly distributed over the screen surface so that the entire screen surface can be utilized and thus, the classifying performance can be more easily exhibited and this is preferable. On the other hand, if particles are flown to one side and introduced to the screen, excessive particles are flown over a screen surface onto which the particle flow is directed, while a screen surface over which the particle flow is scarce dose not contribute to the classification of the particles, thereby causing a problem that a desired classifying performance is not exhibited.

In addition, for example, when a conveyor having a function of conveying particles is used instead of the divider 40, as the particles are fed to the center of the conveyor in a concentrated state, preferably such a problem that the particles spill over from a conveying surface of the conveyor does not occur.

Note that, when a gutter-shaped chute having a V-shaped cross-section as well as having a plurality of steps along a transfer direction, which is disclosed in JP-A S60-36207 as mentioned above, is used instead of the intermediate chute tube 20, particles may come in contact with corner portions formed by the steps in an inner surface of the chute tube, thereby causing a problem that particles, i.e., products, are damaged and accompanying dust may readily be produced therefrom. The problem becomes more prominent when the hardness of particles transferred is lower.

INDUSTRIAL APPLICABILITY

The chute tube for transferring particles and the particle transfer apparatus including the same as well as the processing method of the present invention can be utilized for transferring particles such as, for example, urea particles, and performing processes according to the function of a subsequent unit combined therewith.

DESCRIPTION OF REFERENCE NUMERALS 1 chute tube for transferring particles
10 charging chute tube
11 charge inlet
20 intermediate chute tube
35 discharging chute tube
40 divider
51 first transfer pipe
52 second transfer pipe

The invention claimed is:

1. A chute tube device for transferring particles, comprising:
a charging chute tube having a charge inlet;
a discharging chute tube located at a position vertically lower and horizontally different than the charging chute tube and connected to at least one of a screen, a conveyor, or a divider; and
an intermediate chute tube which is connected to the charging chute tube and the discharging chute tube in a slanting direction;
wherein the intermediate chute tube comprises a groove without steps formed by a combination of a first inclined surface and a second inclined surface, and
the groove is of a cross-sectional shape corresponding to two adjacent sides of a triangle, and one or more flow rectifying plates are arranged on the first inclined surface and the second inclined surface of the intermediate chute tube for narrowing the width of the groove to facilitate the particles flow centrally of the groove.

2. The chute tube device for transferring particles according to claim 1, wherein the intermediate chute tube including the groove has a cross-sectional shape selected from:
a first form of a quadrangle in which one side of the first form quadrangle is shaped to correspond to two adjacent sides of a triangle;
a second form of a quadrangle in which the second form quadrangle is disposed such that any one of the corners is located at a vertically lower position than the other corners; and
a third form of a triangle in which the triangle is disposed such that any one of the corners is located at a vertically lower position than the other corners.

3. The chute tube device for transferring particles according to claim 1, wherein an angle formed by the two adjacent sides of the triangle in the cross-sectional shape of the groove is 45 degrees to 130 degrees.

4. The chute tube device for transferring particles according to claim 1, wherein an angle formed between a central axis of the intermediate chute tube and a horizontal direction is in the range of 30 degrees or more and less than 90 degrees.

5. The chute tube device for transferring particles according to claim 1, further comprising particles therein, the particles being hygroscopic particles.

6. The chute tube device for transferring particles according to claim 1, further comprising particles therein, the particles being urea particles of a particle size in the range of 0.5 to 5 mm.

7. The chute tube device for transferring particles according to claim 1, wherein the one or more flow rectifying plates are arranged such that an angle formed between the one or more flow rectifying plates and a direction orthogonal to a length direction of the intermediate chute tube is equal to or greater than an angle of repose of particles to be transferred, thereby preventing the particles to be transferred from being stagnant.

8. A method for processing particles using the chute tube device of claim 1, the method comprising:
- charging particles to the chute tube device for transferring particles; and
- delivering the particles through the intermediate chute tube to the screen, the conveyor, or the divider, and distributing the particles to each of a plurality of transfer pipes at a desired proportion amount, classifying the particles or conveying the particles,
- wherein when the particles pass through the intermediate chute tube, all the particles move along the groove formed by the combination of the first inclined surface and the second inclined surface and are thereby directed to the screen, the conveyor, or the divider.

* * * * *